(12) United States Patent
Kao

(10) Patent No.: US 7,490,177 B2
(45) Date of Patent: Feb. 10, 2009

(54) SYSTEM METHOD FOR PERFORMING A DIRECT MEMORY ACCESS FOR AUTOMATICALLY COPYING INITIALIZATION BOOT CODE IN A NEW MEMORY ARCHITECTURE

(75) Inventor: Rom-Shen Kao, Durham, NC (US)

(73) Assignee: Infineon Technologies AG, Munich (DE)

(*) Notice: Subject to any disclaimer, the term of this patent is extended or adjusted under 35 U.S.C. 154(b) by 212 days.

(21) Appl. No.: 11/337,754

(22) Filed: Jan. 23, 2006

(65) Prior Publication Data
US 2007/0174602 A1 Jul. 26, 2007

(51) Int. Cl.
G06F 13/00 (2006.01)
(52) U.S. Cl. .................. 710/22; 710/8; 710/9; 710/10; 710/33; 710/34; 713/100; 713/1
(58) Field of Classification Search ............. 710/8–10, 710/22, 33, 34; 713/1, 100
See application file for complete search history.

(56) References Cited

U.S. PATENT DOCUMENTS

| | | | |
|---|---|---|---|
| 5,515,333 A * | 5/1996 | Fujita et al. | 365/229 |
| 6,134,631 A | 10/2000 | Jennings, III | |
| 6,704,840 B2 * | 3/2004 | Nalawadi et al. | 711/118 |
| 6,972,977 B1 * | 12/2005 | Urabe | 365/49.11 |
| 7,139,909 B2 * | 11/2006 | Lee | 713/100 |
| 7,221,615 B2 | 5/2007 | Wallner et al. | |
| 2003/0014688 A1 | 1/2003 | Wu | |
| 2003/0028733 A1 * | 2/2003 | Tsunoda et al. | 711/154 |
| 2005/0027928 A1 | 2/2005 | Avraham et al. | |
| 2006/0294295 A1 | 12/2006 | Fukuzo | |
| 2007/0028030 A1 | 2/2007 | Mahrla et al. | |
| 2007/0033487 A1 | 2/2007 | Ruckerbauer et al. | |
| 2007/0076004 A1 | 4/2007 | Wallner et al. | |
| 2007/0186061 A1 | 8/2007 | Oh et al. | |
| 2008/0007569 A1 | 1/2008 | Kao | |
| 2008/0010418 A1 | 1/2008 | Kao | |
| 2008/0010419 A1 | 1/2008 | Kao | |
| 2008/0010420 A1 | 1/2008 | Kao | |

FOREIGN PATENT DOCUMENTS

CN 1673959 9/2005

OTHER PUBLICATIONS

State Intellectual Property Office of P.R.C. Office Action dated Jul. 4, 2008, for counterpart application No. 200710004042.2.

* cited by examiner

Primary Examiner—Tammara Peyton
(74) Attorney, Agent, or Firm—Patterson & Sheridan, L.L.P.

(57) ABSTRACT

Embodiments of the invention provide a method and apparatus for initializing a computer system, wherein the computer system includes a processor, a volatile memory, and a non-volatile memory. In one embodiment, the method includes, when the computer system is initialized, automatically copying initialization code stored in the non-volatile memory to the volatile memory, wherein circuitry in the volatile memory automatically creates the copy, and executing, by the processor, the copy of the initialization code from the volatile memory.

11 Claims, 8 Drawing Sheets

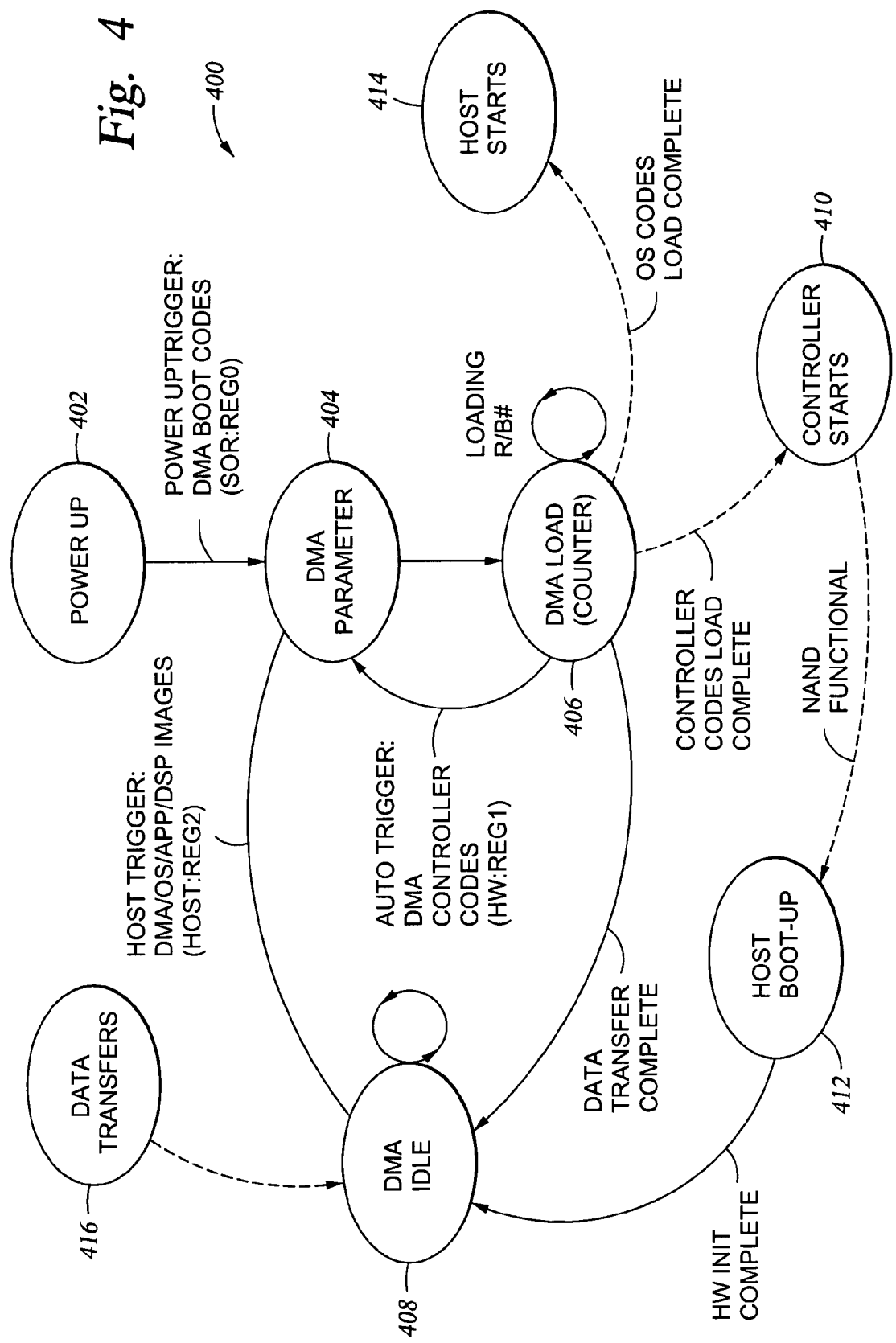

SYSTEM METHOD FOR PERFORMING A DIRECT MEMORY ACCESS FOR AUTOMATICALLY COPYING INITIALIZATION BOOT CODE IN A NEW MEMORY ARCHITECTURE

BACKGROUND OF THE INVENTION

1. Field of the Invention

The invention generally relates to initialization of a computer system. Specifically, the invention relates to an improved memory architecture for booting a computer system.

2. Description of the Related Art

Many modern electronic devices such as cell phones, PDAs, portable music players, appliances, and so on typically incorporate an embedded computer system. An embedded computer system typically contains a computer processor (referred to as a host), non-volatile memory (such as a flash memory and/or ROM memory), and volatile memory such as a dynamic random access memory (DRAM). The host may include a central processing unit (CPU), digital signal processor (DSP), microcontroller unit (MCU) or direct memory access (DMA) data transmission device.

During operation, a host typically runs an operating system or other operating code. Because volatile memory may typically be accessed more quickly than non-volatile memory, the operating code may be stored in the volatile memory and accessed from the volatile memory by the host. However, because volatile memory requires a power source to maintain data stored therein, when the embedded system is powered down, the volatile memory is typically erased. Accordingly, when the embedded system is powered up (e.g., when the embedded system enters a reset state), the operating code required by the host system is typically loaded into the volatile memory. Typically, the operating code is loaded from the nonvolatile memory (e.g., a ROM and/or flash memory) which retains stored data even when the embedded system is not being powered. The process of loading code stored in non-volatile memory into volatile memory and executing the code from volatile memory may be referred to as code shadowing.

When the embedded system is powered up, the embedded system typically performs a boot sequence to properly load the operating code from the nonvolatile memory to the volatile memory and initialize the host with the operating code. In order to perform the boot sequence, the host typically accesses boot code which is stored in a predefined area of non-volatile memory. The boot code is simple code which may be executed by the host, enabling the host to perform more complicated actions required to load the operating code into volatile memory and begin execution of the operating code.

In some cases, the host may transfer the operating code from the nonvolatile memory to the volatile memory using direct memory access (DMA). DMA allows a portion of memory to be quickly and automatically moved from one storage location to another storage location. To perform the DMA transfer, the host may need to initialize the DMA engine. In some cases, the DMA engine may be located in the host. To initialize the DMA engine, the host may use information and/or instructions provided by the boot code. Once the DMA engine is initialized, the host may issue commands to the DMA engine to load operating code from the non-volatile memory into the volatile memory. The host may then begin executing the operating code and any other code necessary for proper operation of the host.

Booting an embedded system as described above may require a variety of special configurations for the host. For example, the host typically requires multiple interfaces configured to interface multiple types of memory (Flash, ROM, and DRAM types of memory). The host is also typically configured to automatically load the boot code, load controller code for an embedded microcontroller, and provide capabilities for initializing and managing DMA transfers from the non-volatile memory to the volatile memory as a part of the boot sequence. Such special configurations required by the host for booting the embedded system typically reduce flexibility and increase design costs of the host and the embedded system.

Accordingly, what is needed is an improved system and method for booting an embedded system.

SUMMARY OF THE INVENTION

Embodiments of the invention provide a method and apparatus for initializing a computer system, wherein the computer system includes a processor, a volatile memory, and a non-volatile memory. In one embodiment, the method includes, when the computer system is initialized, automatically copying initialization code stored in the non-volatile memory to the volatile memory, wherein circuitry in the volatile memory automatically creates the copy, and executing, by the processor, the copy of the initialization code from the volatile memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a state diagram depicting an exemplary state machine for booting an embedded system according to one embodiment of the invention.

DETAILED DESCRIPTION OF THE PREFERRED EMBODIMENT

Embodiments of the invention provide an improved system and method for booting an embedded system. In one embodiment of the invention, boot codes and controller codes stored in a non-volatile memory may be loaded by a DMA engine located on a volatile memory chip into a boot code buffer and a controller code buffer. By utilizing the DMA engine located on the volatile memory chip to load boot and controller codes, the processing workload necessary to boot the embedded system may be offloaded from a host processor to the volatile memory chip, thereby reducing the complexity (and therefore the overall cost) of the host processor and the embedded system.

After the boot codes have been loaded from the non-volatile memory to the boot code buffer in the volatile memory, the host processor may then access the boot code stored in the boot code buffer. When the host accesses the boot code stored in the boot code buffer, the host may perform boot operations. In one embodiment, the boot operations may include issuing commands to the DMA engine to load operating system code in the volatile memory. The host may then execute the operating system code stored in the volatile memory. In one embodiment, the boot codes and controller codes may be loaded by the DMA engine into the volatile memory chip without interaction with the host.

Figure 1:
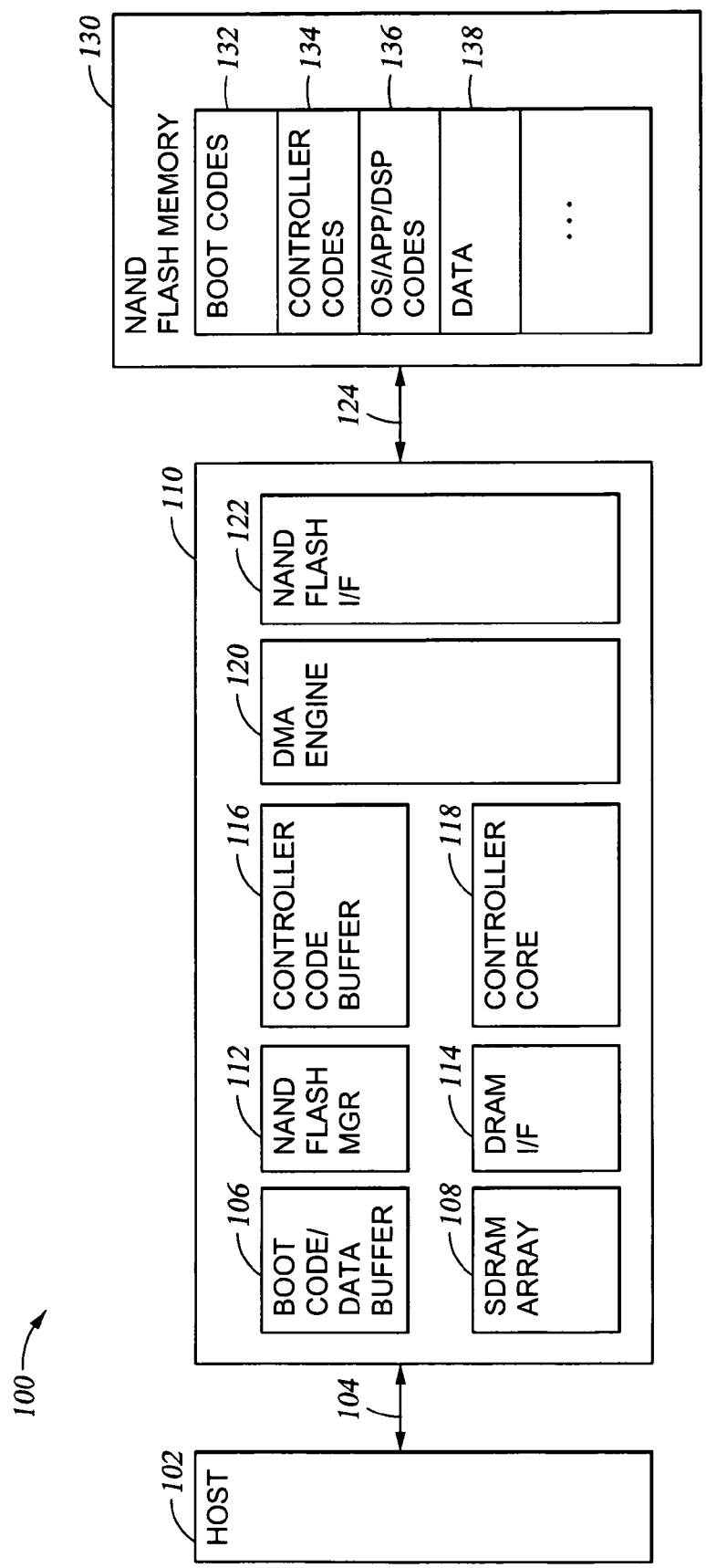
FIG. 1 is a block diagram depicting an exemplary system according to one embodiment of the invention.

Embodiments of the invention are described below with respect to an embedded system including a host processor, volatile memory, and non-volatile memory. However, in some cases, the embedded system may contain multiple host processors, multiple volatile memories, and multiple non-volatile memories. The volatile memories may include any type of DRAM, SRAM, or any other type of volatile memory. The non-volatile memories may include any type of NAND flash memory, NOR flash memory, programmable read-only memory (PROM), electrically-erasable programmable read-only memory (EE-PROM), read-only memory (ROM), or any other type of non-volatile memory. The host processor may include any type of processor, including a central processing unit (CPU), a digital signal processor (DSP), a microcontroller unit (MCU) or a direct memory access (DMA) data transmission device. Also, each chip in the system may in some cases contain multiple types of processors and/or memories. For example, the host may include a CPU, DSP, and SRAM. The non-volatile memory may, in some cases, include a ROM and a flash memory. Other exemplary combinations which may be used with embodiments of the invention should be readily apparent to one of ordinary skill in the art An Exemplary Embedded System FIG. 1 is a block diagram depicting an exemplary system 100 according to one embodiment of the invention. As depicted, the system 100 may include a host 102, volatile memory (DRAM device 110), and non-volatile memory (NAND flash memory 130). The host may access the DRAM device 110 via DRAM connection 104. The DRAM device 110 may access the NAND flash memory 130 via a flash interface 122 and flash memory connection 124. In some cases, because the flash interface is located on the DRAM device 110, the host 102 may not require a flash memory interface or connection, thereby simplifying design and selection of the host 102. Optionally, where desired, the host 102 may include a flash memory interface and connection.

In one embodiment of the invention, the DRAM device 110 may include an SDRAM memory array 108. The DRAM device may also contain a boot code and data buffer 106, a DRAM interface 114, a flash manager 112, a controller code buffer 116, a embedded microcontroller core 118, and DMA engine 120. As described below, the NAND flash interface 122 may be used to access information stored in the NAND flash memory 130 including boot codes 132, controller codes 134, operating system and application code 136, data 138, and any other information stored in the NAND flash memory 130.

Figure 2:
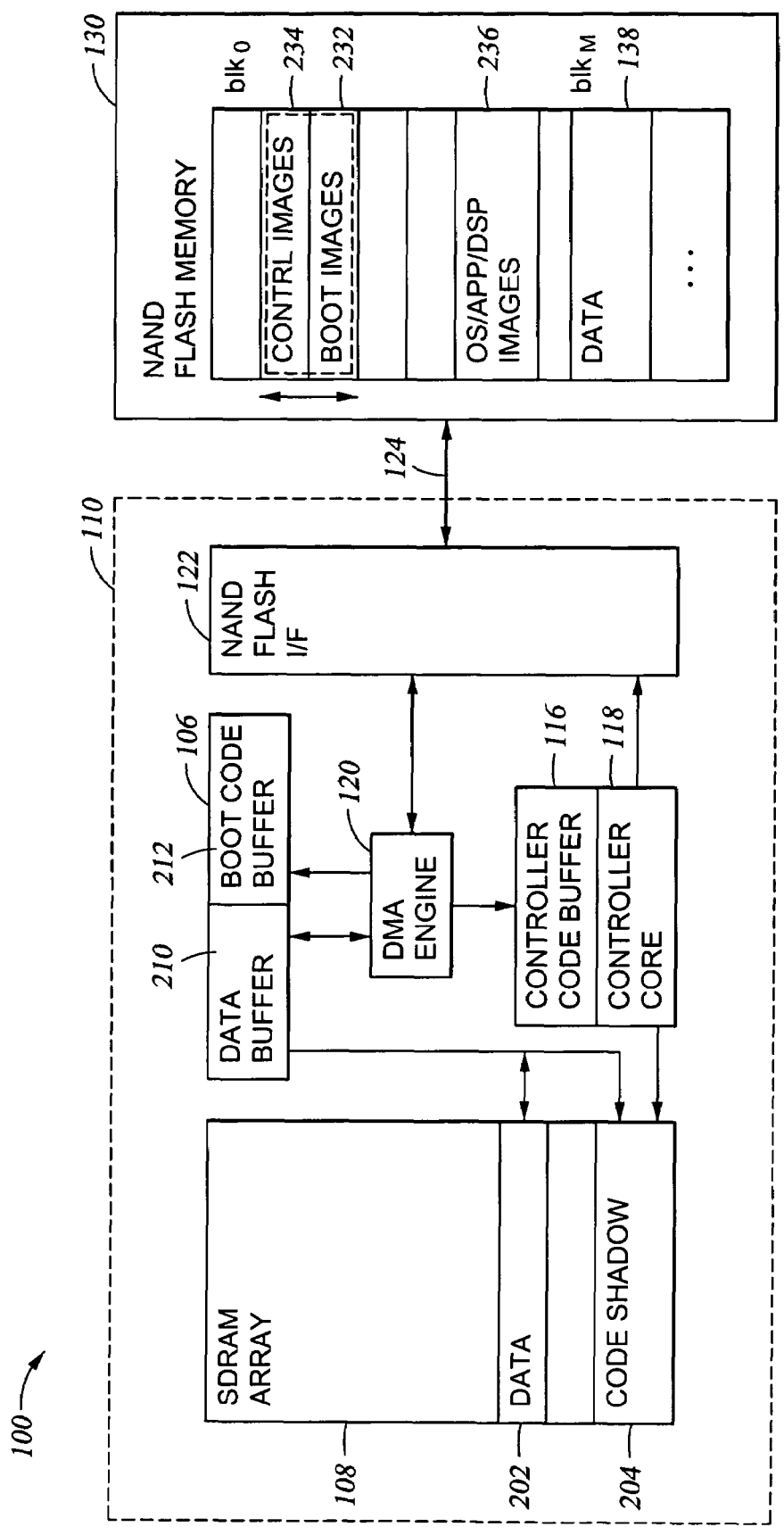
FIG. 2 is a block diagram depicting a detailed view and data path of an exemplary DRAM device and NAND flash memory.

FIG. 2 is a block diagram depicting a detailed view and data path of the DRAM device 110 and NAND flash memory 130 in accordance with one embodiment of the invention. In some cases, the NAND flash memory 130 may be divided into blocks ($blk_0$ to $blk_m$) and partitioned (e.g., divided into non-overlapping memory areas). Each of the types of code 132, 134, 136, depicted in FIG. 1 may be stored as images (e.g., copies made from a single source) in the partitions. As depicted in FIG. 2, the NAND flash memory 130 may contain controller code images 234, boot images 232, operating system, application and/or DSP code images 236. The NAND flash memory 130 may also contain other data 138. Also, as previously described, the DRAM memory device 110 may contain a data and boot code buffer 106. In some cases, the data buffer 210 and boot code buffer 212 may be provided as separate buffers, as depicted.

As described below with respect to the boot sequence, the DMA engine circuitry 120 may be used to automatically load boot codes 132 from the boot code images 232 into the boot code buffer 212 and load controller codes 134 from the controller code images 234. After the boot codes 132 and controller codes 134 have been loaded into the DRAM memory device 110, commands issued to the DMA engine 120 may be used to initiate a DMA access which copies desired code from the OS, application, and DSP code images 236 and other data 138 into a code shadow 204 and other data 202 stored in the SDRAM array 108.

In some cases, by offloading work from the host 102 to the DMA engine 120 and embedded microcontroller 118 in the DRAM memory device 110, design and operation of the host 102 and embedded system 100 may be simplified. Also, by storing the boot codes 132, controller codes 134, and OS/Application/DSP code 136 in programmable non-volatile memory 130, code needed for operation of the embedded system 100 may be stored and retrieved in a more flexible manner. For example, in order to update the boot codes 132, controller codes 134, and/or OS/Application/DSP code 136, the new codes may be merely rewritten over the old codes in the programmable non-volatile memory 130. Because information about the storage and retrieval of the codes may also be stored in the programmable non-volatile memory, new storage and retrieval information may also be programmed into the programmable non-volatile memory 130 when any of the codes are updated.

Exemplary Boot Sequence

Figure 3A:
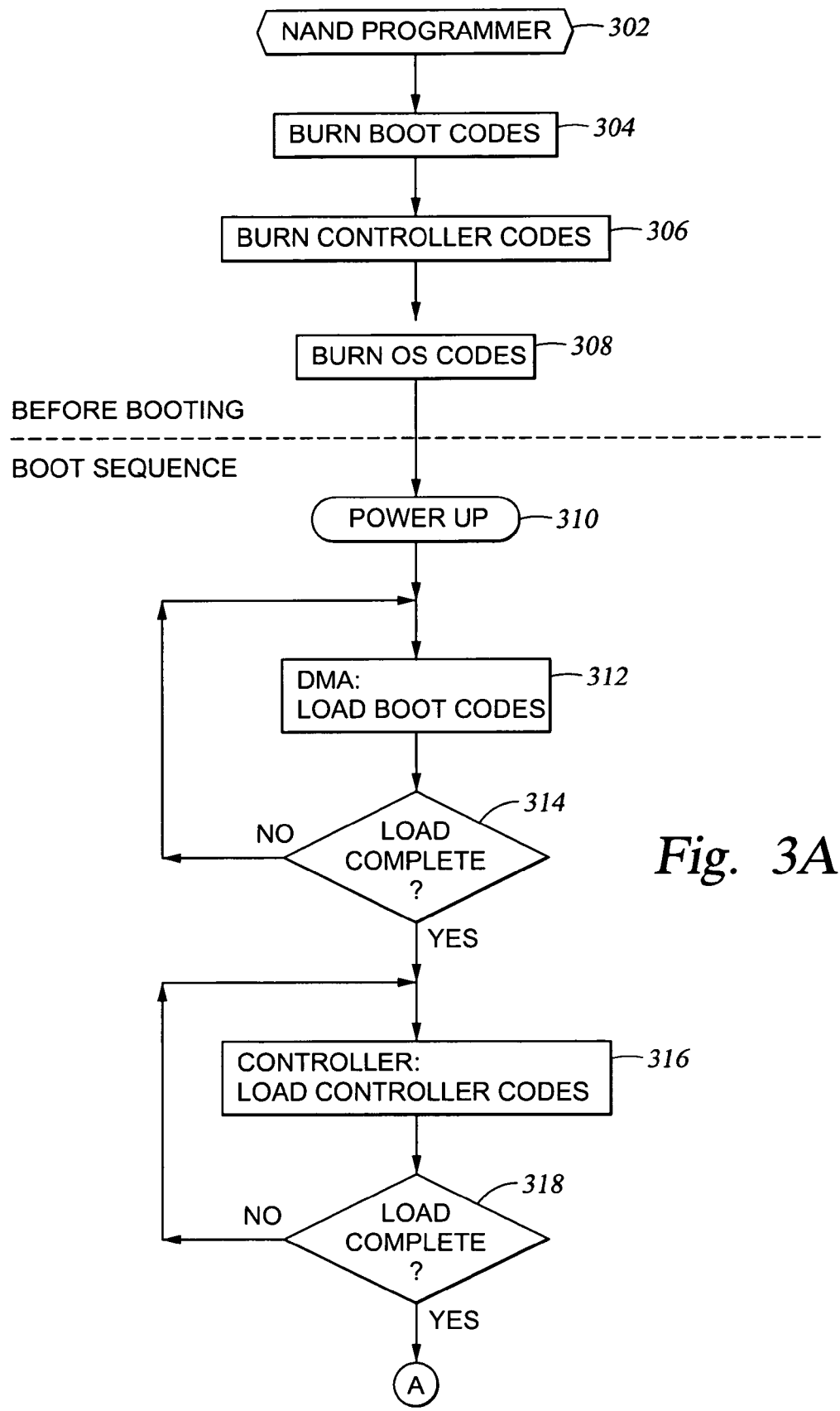
FIGS. 3A and 3B are flow diagrams depicting an exemplary boot sequence for an embedded system according to one embodiment of the invention.
Figure 3B:
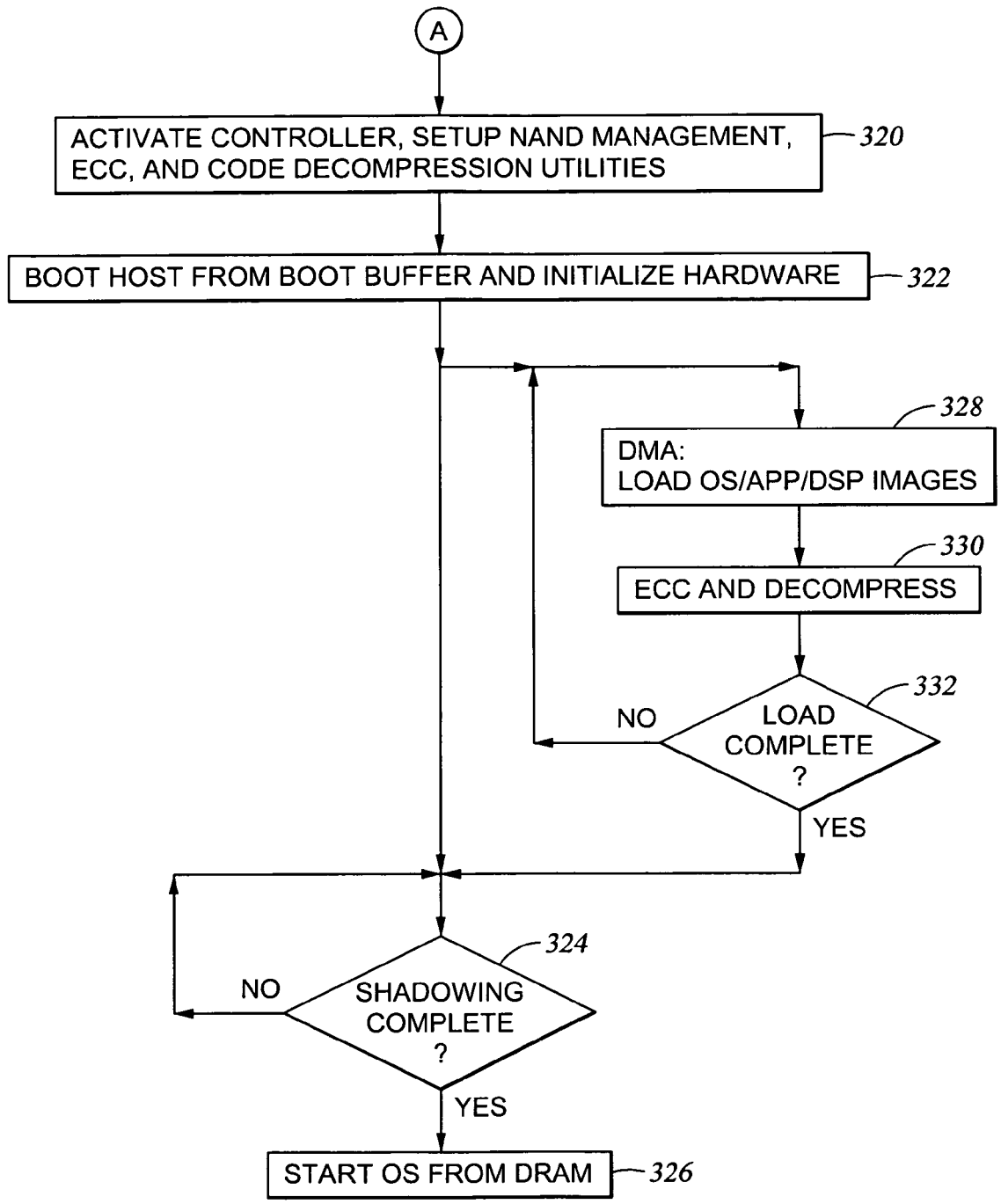

FIGS. 3A and 3B are flow diagrams depicting an exemplary boot sequence for an embedded system 100 according to one embodiment of the invention. The boot sequence may utilize information stored in the NAND flash memory 130. The information may be stored in the NAND flash memory 130 before the system 100 is initially booted, for example, by a NAND programmer 302. The NAND programmer 302 may burn boot codes 132 (step 304), controller codes 134 (step 306), and OS codes 136 (step 308) into the NAND flash memory 130. Design considerations known to those skilled in the art may be made in selecting the relative memory size and placement of each of the codes 132, 134, and 136.

When the system 100 is powered up at step 310, the boot sequence may begin at step 312 by loading the boot codes 132. In one embodiment, the boot codes 132 may be loaded from the NAND flash memory 130 into the boot code buffer 212 using the DMA engine circuitry 120 of the DRAM memory device 110. As known to those skilled in the art, the DMA access may include automatic transfer of the boot code 132 from the NAND flash memory 130 to the boot code buffer 212 without external control or input, e.g., by the host 102 or other external controller circuitry. The DMA access may continue until the DMA load completes (step 314).

The DMA engine circuitry 120 may utilize the NAND flash interface 122 of the DRAM memory device 110 to access the NAND flash memory 130. In one embodiment, the DMA engine circuitry 120 or other suitable circuitry in the DRAM device may be automatically configured to load the boot codes 134 from a predefined area of the NAND flash memory 130 (e.g., beginning at block 0, memory address 0, and continuing for a designated length). Optionally, the source address and size of the boot code may be provided by an external device, by data stored in an area of memory (e.g., in a ROM or in a predefined area of the NAND flash memory 130) or in another manner, as described below.

After the boot codes 132 have been loaded at steps 312 and 314, the controller codes 116 used by the embedded microcontroller core 118 may be loaded beginning at step 316. In some cases, loading of the controller codes 134 may be initiated automatically after the boot codes 132 have finished loading. In one embodiment, the controller codes 134 may be loaded from the NAND flash memory 130 to the controller code buffer 116 where the controller codes 134 may be accessed by the embedded microcontroller core 118. In some cases, the DMA engine 120 may be configured to automatically load the controller codes 134, e.g., after loading the boot codes 132. The controller codes 134 may be loaded from a predefined area of the NAND flash memory 130, using instructions in the boot codes 132, using instructions issued from an external device, or using any other manner known to those skilled in the art. Further embodiments for loading the boot and controller codes 132, 134 are also described in greater detail below. The DMA access used to load the controller codes 134 may continue until the load completes at step 318.

After the boot codes 132 and controller codes 134 have been loaded into the boot code buffer 212 and the controller code buffer 116, respectively, the embedded microcontroller 118 may be activated, and the NAND flash manager 112, error correction code (ECC), and code decompression utilities may be setup at step 320. The embedded microcontroller 118 may be used to provide NAND flash management functionality for the NAND flash memory 130 (e.g., thereby off-loading such flash memory management from the host 102). The NAND flash manager 112 may also be used by the embedded microcontroller 118 to access to the NAND flash memory 130 (e.g., by providing support for reading from and writing to the NAND flash memory 130). The ECC utilities may be used to ensure that data received from the NAND flash memory 130 has been correctly transmitted and possibly correct errors in the transmission, if any. The code decompression utilities may be used to decompress code stored in a compressed format (e.g., the OS/Application code 136) which is retrieved from the NAND flash memory 130.

After the embedded microcontroller 118 has been activated and after the related support circuitry has been initialized, the host 102 may be booted from the boot buffer 212. In one embodiment of the invention, the boot buffer 212 may be accessed by the host 102 via the DRAM connection 104. The boot buffer 212 may be accessed by the host 102, for example, by requesting data from a specific, predefined memory address within DRAM memory device 110. Optionally, special commands issued to the memory device 110 may be used to access the boot buffer 212. The host 102 may use the boot code 132 stored in the boot buffer 212 to perform more complicated actions required to load the operating system code 136 into the DRAM memory device 110 and begin execution of the operating system code 136 and other hardware devices in the host system, etc. For example, the boot code 132 may disable interrupts, initialize mode registers in the host 102, and issue commands to the memory device 110 to begin code shadowing of the operating system code 136. The boot code 132 may also provide information which indicates which commands should be issued to the memory device 110 to perform code shadowing operations and the location of the operating system code 132 within the NAND flash memory 130.

After the host 102 has booted and initialized the hardware at step 322, the OS/App/DSP images 236 may be loaded at step 328. In one embodiment of the invention, the host 102 may issue commands to the DMA engine 120 to initiate the loading of the OS/App/DSP images 236 from the NAND flash memory 130 to the SDRAM array 108 via a DMA transfer. In some cases, the host 102 may use the boot code 132 to issue the appropriate commands to the DMA engine 120 and/or controller 118. Once the commands have been issued to the DMA engine 120, the DMA engine 120 may automatically and autonomously perform the DMA transfer without interaction from the host 102. Meanwhile, the host 102 may remain active with some other tasks (which may include waiting in a wait state) until the memory device 110 and/or DMA engine 120 indicate that the shadowing is complete (step 324).

While the OS/App/DSP images 236 are loaded, the code being loaded may be checked using embedded ECC and decompressed (if the code 236 is stored in a compressed format) at step 330. In one embodiment, the embedded microcontroller core 118 and/or other components (e.g., the DMA engine circuitry 120 and the NAND flash manager 112) may check the transferred code using ECC and perform the decompression. The DMA transfer may continue until the DMA load of the code shadow 204 is complete (step 332).

After the host 102 determines that the shadowing is complete (step 324), the host may start the operating system code 136 (and any other code utilized by the host 102) from the code shadow 204 located in the SDRAM array 108. In one embodiment, a signal or command issued by the DMA engine 120 after the DMA transfer of the OS/App/DSP codes 136 is complete may be used to indicate to the host 102 that the code shadowing has been completed. When the host 102 starts the operating code from the DRAM memory device 110, normal operations of the embedded system 100 may commence, successfully completing the boot sequence 300.

The boot sequence described above may help improve design of the embedded system for several reasons. For example, in some cases, the host 102 may not be used for booting preparation, such as loading the boot codes 132, thereby overcoming the need to enable prior initialization of the host 132 before loading the boot codes 132. Also, the host 102 may not be involved in initialization of the NAND flash memory 130, again reducing the need for prior initialization of the host 102. Further, because the DRAM memory device 110 may contain the DMA engine 120 and embedded microcontroller core 118, the host 102 need not provide extensive support for the DMA transfers and code shadowing. Instead, the host 102 may merely issue commands to the DRAM memory device 110 and allow the DRAM memory device 110 to perform the necessary DMA transfers.

FIG. 4 is a state diagram depicting an exemplary state machine 400 for booting an embedded system 100 according to one embodiment of the invention. When the system 100 is initially powered up, each of the system components may enter a reset state 402. In the next state (the DMA parameter state 404), the DMA engine circuitry 120 may be initialized with DMA parameters (e.g., a source address, destination address, and size of code to be moved) for loading the boot codes 132. In one embodiment of the invention, the DMA parameters for the boot codes 132 may be placed in a register (Reg0) in the DMA engine 120 using a sense-on-reset configuration (SOR). The DMA engine registers and SOR configuration are described in greater detail below.

After the DMA parameters for the boot code 132 have been stored, the DMA load may be performed in DMA load state 406. In one embodiment, the DMA engine 120 may utilize an automatic counter to transfer the boot codes 132 from the source address to the destination address until the boot code 132 designated by the size parameter has been moved. Each time a read request is sent to the NAND flash memory 130, a signal from the NAND flash memory (R/B#, which is asserted when the NAND memory is Ready and lowered when the NAND memory is Busy) may remain low, indicating that a page is being loaded from the NAND flash memory 130 (e.g., that the NAND flash memory 130 is in a busy state). When the R/B# signal is asserted, indicating that the page has been loaded, the DMA engine 120 may either continue the DMA transfer by loading another page from the NAND flash memory 130 (depending on the counter value and size parameter), or complete the load and transition to the next state.

After the boot codes 132 have completed loading via the DMA engine 120, an automatic trigger may cause the state to transition back to DMA parameter state 404 where the DMA parameters for transferring the controller codes 134 are initialized. In one embodiment, the DMA parameters may be initialized by loading a source address, destination address, and size for the controller codes 134 into a register (Reg1) of the DMA engine 120. After the DMA parameters for the controller codes 134 have been stored, the state may transition to DMA load state 406 where the DMA load of the controller codes 134 is performed by transferring the codes 134 from the source address to the destination address while a counter tracks the size of the code transferred, as described above.

After the controller codes 134 have been loaded and the initial DMA transfers are complete, the state may transition to DMA idle state 408 where the DMA engine 120 remains in the idle state 408. At the same time, the embedded microcontroller 118 may start at controller start state 410 and initialize support for accessing the NAND flash memory 130, such as the NAND flash manager 112, ECC, and code decompression functionality. As described above, the embedded microcontroller core 118 may utilize controller codes 134 stored in the controller code buffer 116 to perform the initialization. After the embedded microcontroller starts and the NAND flash memory 130 is functional, the state may transition to host boot-up state 412 where the host 102 is booted up, for example, using the boot codes 132 stored in the boot code buffer 212.

When the host 102 boots up and completes any hardware initialization, the host may issue commands to the DMA engine 120 (e.g., using commands provided by the boot code 132) to cause the DMA engine 120 to transition from the DMA idle state 408 to DMA parameter state 404 where the host 102 initializes the DMA parameters of the DMA engine 120 to perform the code shadowing of the OS/App/DSP images 236 from the NAND flash memory 130 into the SDRAM array 108. The host 102 may initialize the DMA engine 120, for example, by providing DMA parameters for the source address, destination address, and size of the OS/App/DSP images 236. The parameters for the OS/App/DSP images 236 may be stored, for example, in a DMA engine register (Reg2). After the DMA parameters for the OS/App/DSP images 236 have been stored, the state may transition to DMA load state 406 where the DMA load of the OS/App/DSP images 236 is performed by transferring the OS/App/DSP codes 136 from the source address to the destination address while a counter tracks the size of the code transferred, as described above.

After the OS/App/DSP codes 136 have been loaded into the SDRAM 108 via the DMA transfer, the DMA engine 120 may return to a DMA idle state 408 while the host 102 starts the operating system using the code shadow 204 (host starting OS state 414). After the host 102 begins normal operations, the host 102 or other components in the embedded system 100 may initialize further DMA data transfers beginning at data transfer state 416.

Control of the DMA Engine

Figure 5:
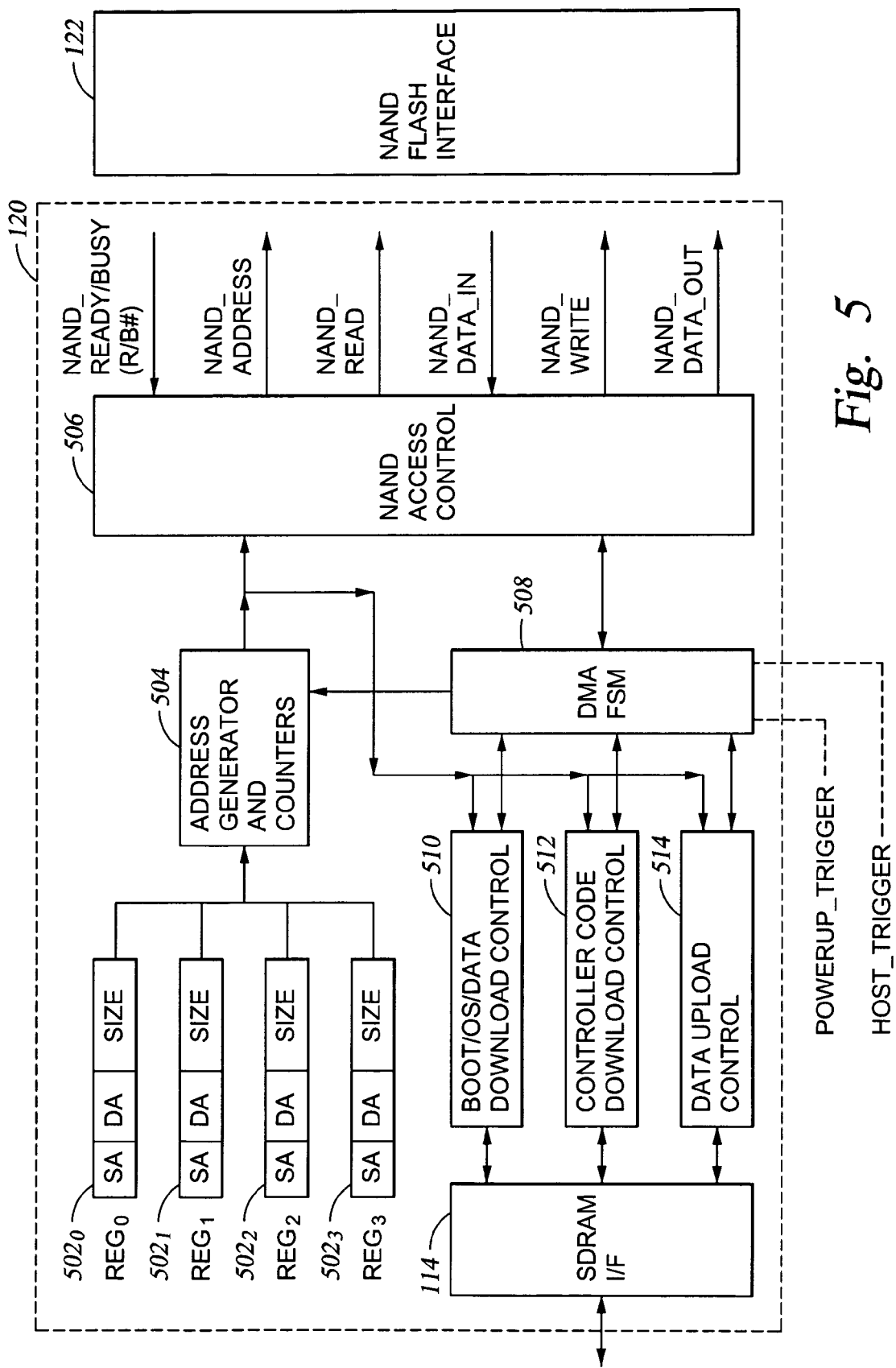
FIG. 5 is a block diagram depicting a detailed view of an exemplary DMA engine/parameter setting according to one embodiment of the invention.

FIG. 5 is a block diagram depicting a detailed view of an exemplary DMA engine 120 and parameter settings according to one embodiment of the invention. As depicted, the DMA engine 120 may contain multiple registers $502_0$, $502_1$, $502_2$, $502_3$, an address generator and counters 504, NAND access control 506, and a DMA finite state machine (FSM) 508. The DMA engine 120 may also contain a Boot/OS/Data download control 510, controller code download control 512, and data upload control 514. Each of the components are described in greater detail below.

In one embodiment of the invention, the DMA engine registers $502_0$, $502_1$, $502_2$, $502_3$ may be used to control which data is loaded from the NAND flash memory 130 into the SDRAM 108 and vice versa. As depicted, values may be stored in the registers indicating a source address (SA), destination address (DA), and size of data to be transferred.

To perform a DMA transfer, the registers $502_0$, $502_1$, $502_2$, $502_3$ may be input into the address generator and counters 504 which may be controlled by the DMA FSM 508. The address generator and counters 504 may use each source address, destination address, and size entry to generate the source address and destination address. The address generator and counters 504 may also keep counters which monitor the progress of a DMA transfer. For example, when a DMA transfer is initiated, the address generator and counters 504 may initialize a counter and provide source and destination addresses to the NAND flash memory 130 (via the NAND flash interface 122) and to the SDRAM array 108 (via the SDRAM interface 114, or other interfaces, e.g., for the boot code buffer 212).

After the address generator and counter have provided the source and destination addresses, the DMA FSM 508 may issue commands to the NAND access control 506 requesting data to be read from the source address and written to the destination address. Depending on the data being transferred, the DMA engine 120 may utilize the Boot/OS/Data download control 510, controller code download control 512, or data upload control 514 to perform the transfer. After the transfer has been performed, the address generator and counters 504 may increment or decrement a counter and calculate the next source and destination address for the DMA transfer. The DMA transfer may continue until an amount of data equal to the size parameter (tracked, e.g., using the counters in the address generator and counters 504) has been transferred.

Initialization of the DMA Engine

As described above, in one embodiment of the invention, when the embedded system is powered on and the DMA engine 120 is initialized, the DMA engine 120 may automatically transfer boot codes 132 and controller codes 134 from the NAND flash memory 130 to buffers 106, 116 in the DRAM device 110 for use in initializing and operating the host 102 and embedded microcontroller 118. Commands may then be issued to the DRAM device 110 (e.g., by the host 102) causing the OS/App/DSP codes 136 to be loaded via a DMA transfer from the NAND flash memory 130 to the SDRAM array 108 where the codes 136 may then be accessed by the host 102. In some cases, In one embodiment, the PowerUp_Trigger signal and Host_Trigger signal issued to the DMA engine 120 (e.g., to the DMA FSM 508) may be used to place the DMA FSM in the proper state for loading the boot, controller, and/or OS/App/DSP codes 132, 134, 136. For example, when the PowerUp_Trigger signal is received, the DMA engine 120 may automatically load the boot and controller codes 132, 134. Later, when the Host_Trigger signal is received, the DMA engine 120 may automatically load the OS/App/DSP codes 136.

In one embodiment of the invention, to perform the initial transfer of the boot codes 132 from the NAND flash memory 130 to the boot code buffer 212, the first register $502_0$ of the DMA engine 120 may be initialized with a source address SA and destination address DA and a size of the boot codes 132 being transferred. In some cases, the initialization information may be preset (e.g., stored in a ROM or hard-wired) in the DMA engine 120. Optionally, the initialization information may be stored in a predefined area of the NAND flash memory 130. The initialization information may also be received from any convenient external source. In some cases, a combination sources (predefined, ROM, NAND flash memory 130, and/or external sources) may be utilized to obtain the initialization information for the DMA engine 120. Initialization information for the controller codes and OS/App/DSP codes 136 may also be received from such sources or a combination of such sources.

Figure 6:
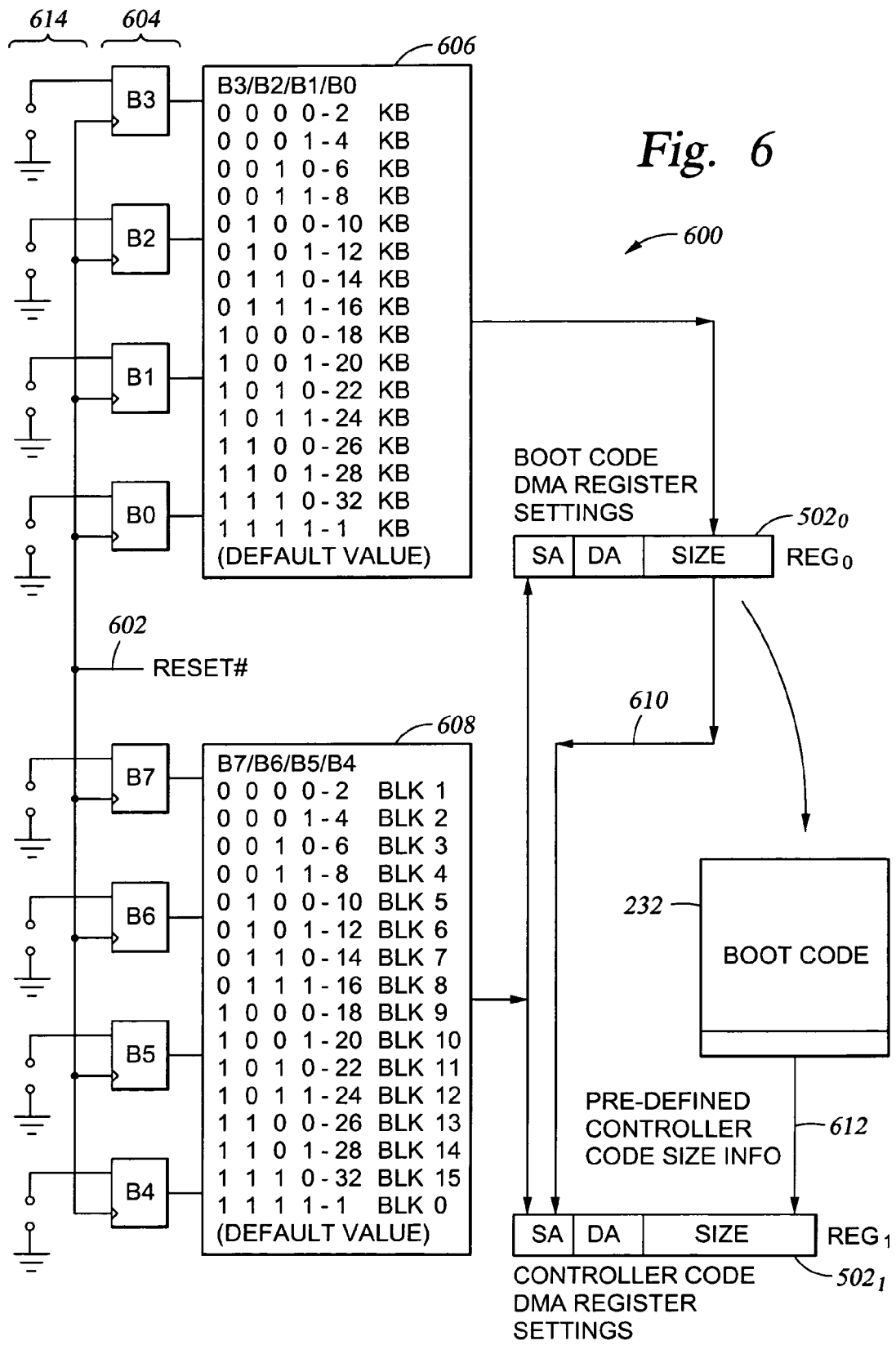
FIG. 6 is a block diagram depicting circuitry for initializing the DMA engine using a sense-on-reset scheme according to one embodiment of the invention.

FIG. 6 is a block diagram depicting circuitry 600 for initializing the DMA engine 120 using a sense-on-reset scheme according to one embodiment of the invention. In the depicted case, signals applied to configuration pins 614 may be used to select a source address SA and size for the boot codes 132 to be loaded. As described above, the boot codes 132 may be loaded into a boot code buffer at a predefined location, such that a destination address DA for the boot codes 132 may not be utilized or provided via the configuration pins 614. In some cases, because the configuration pins 614 may be shared for regular operations during a non-RESET mode (for example, the configuration pins 614 may be used as address pins or control pins during a non-RESET mode) on some types of devices such as the DRAM device 110, additional pins may not be needed or added to the DRAM device 100 to provide the source address and size for initialization of the DMA engine 120.

In one embodiment of the invention, the data placed on the configuration pins 614 may be latched using latches 604, e.g., during a sense-on-reset (SOR) operation. During the SOR operation, a reset signal may be generated internally or received by the DRAM device 110 via the reset pin 602 (RESET#) indicating that the system 100 has been reset or powered-up. For example, when the system 100 is powered up, the PowerUp_Trigger signal may be generated by the DRAM device 110. When the reset signal is detected, the latches 604 may latch the data provided via the configuration pins 614. In one embodiment of the invention, the initialization data on the configuration pins 614 may be provided by an external device such as the host 102 or any other convenient device. Optionally, the initialization data on the configuration pins 614 may be provided via a hard-wired connection to desired voltage levels (e.g., via pull-up or pull-down resistors) if desired.

After the reset signal has been received and the initialization data provided on the configuration pins 614 has been latched by latches 604, the initialization data may be placed in the appropriate registers. In one embodiment of the invention, the initialization data may be used to look-up a source address and size for the boot codes 132 in a source address table 608 and a size table 606. As depicted, if four reset pins are used for the source address, the look-up table 608 may provide 16 different entries for the source address. For example, the source address may be provided as a block number within the NAND flash memory 130. Optionally, more pins may be provided and direct addressing may be utilized for the source address. With respect to the size value, if four reset pins are used for the size value, the size table 606 may contain 16 possible entries from which a size of the boot code 132 may be selected. For example, the size value may be provided as a number of kilobytes (KB). As depicted, each of the tables 606, 608 may have default values which may be applied either by applying appropriate voltages to the configuration pins 614 or by leaving the configuration pins 614 disconnected.

After the source address and size have been determined, the source address and size may be stored, for example, in the first register $502_0$ of the DMA engine 120. Once the boot codes 132 have been loaded from boot code image 232 in the NAND flash memory 130 to the SDRAM array 108 via a DMA transfer, the DMA engine 120 may proceed to load the controller codes 134.

In one embodiment of the invention, the controller codes 134 may be loaded using data stored in the boot codes 132, either by using instructions in the boot codes 132 to issue commands to the DRAM device 110 to cause the controller codes 134 to be loaded or by loading the data in the boot codes 132 directly into a register in the DMA engine 120. Also as described above, other sources may be utilized for obtaining information used to load the controller codes 134.

As depicted in FIG. 6, in one embodiment, the controller code DMA register settings may be obtained using data from the boot code DMA register settings and from data in the boot codes 132 themselves. For example, in some cases, the controller code image 234 may be stored contiguously (e.g., in the next available memory space) in the NAND flash memory 130 with the boot code image 232. Thus, to determine the source address for the controller code image 234, the source address of the boot code image 232 may be added to the size 610 of the boot code image 232. The resulting address may point to the beginning of the controller code image 134. With respect to the destination address for the controller codes 134, as previously described, the address may be predetermined because the controller codes may be stored in the control code buffer 116.

In one embodiment, the size of the controller codes 134 to be transferred may be obtained from data stored in or at the end of the boot code image 232. For example, the size of the predefined controller code size information may be loaded 612 from the end of the boot code image 232 into the register $502_1$ for the controller codes settings. Once the register has been initialized, the DMA engine 120 may perform a DMA transfer of the controller codes 134 from the NAND flash memory 130 to the controller code buffer 116.

In one embodiment, DMA engine registers $502_2$, $502_3$ may be utilized for subsequent transfers, for example, of the OS/App/DSP codes 136 or for any other transfers. Optionally, instead of utilizing multiple registers, the registers for the boot code 132 and controller code 134 transfers may be reused. Optionally, in some cases, a single register may be used for initializing each DMA transfer.

To initialize the DMA engine registers $502_2$, $502_3$ for transferring the OS/App/DSP codes 136, any of the methods described above may be utilized. In one embodiment, the host 102 may access the boot code buffer 212 and utilize instructions in the boot code 132 to initialize the DMA engine registers $502_2$, $502_3$. The DMA engine 120 may then automatically perform the code shadowing of the OS/App/DSP codes 136 without interaction with the host 102. After the code shadow 204 has been created, the host 102 may execute the OS/App/DSP codes 136 from the SDRAM array 108 and begin regularly operating the embedded system 100.

While described above with respect to a DRAM memory device 110 have an SDRAM array 108, a data buffer 210, a boot code buffer 212, and a controller code buffer 116, any convenient configuration of buffers and memory arrays may be utilized for the operations described above. For example, in one embodiment, each DMA transfer may occur between the NAND flash memory 130 and the SDRAM array 108 without storing code in separate, special purpose buffers. Optionally, in some cases, code may be initially loaded into the SDRAM array 108 and then transferred to buffers before being accessed by other devices and/or circuitry.

Figure 7:
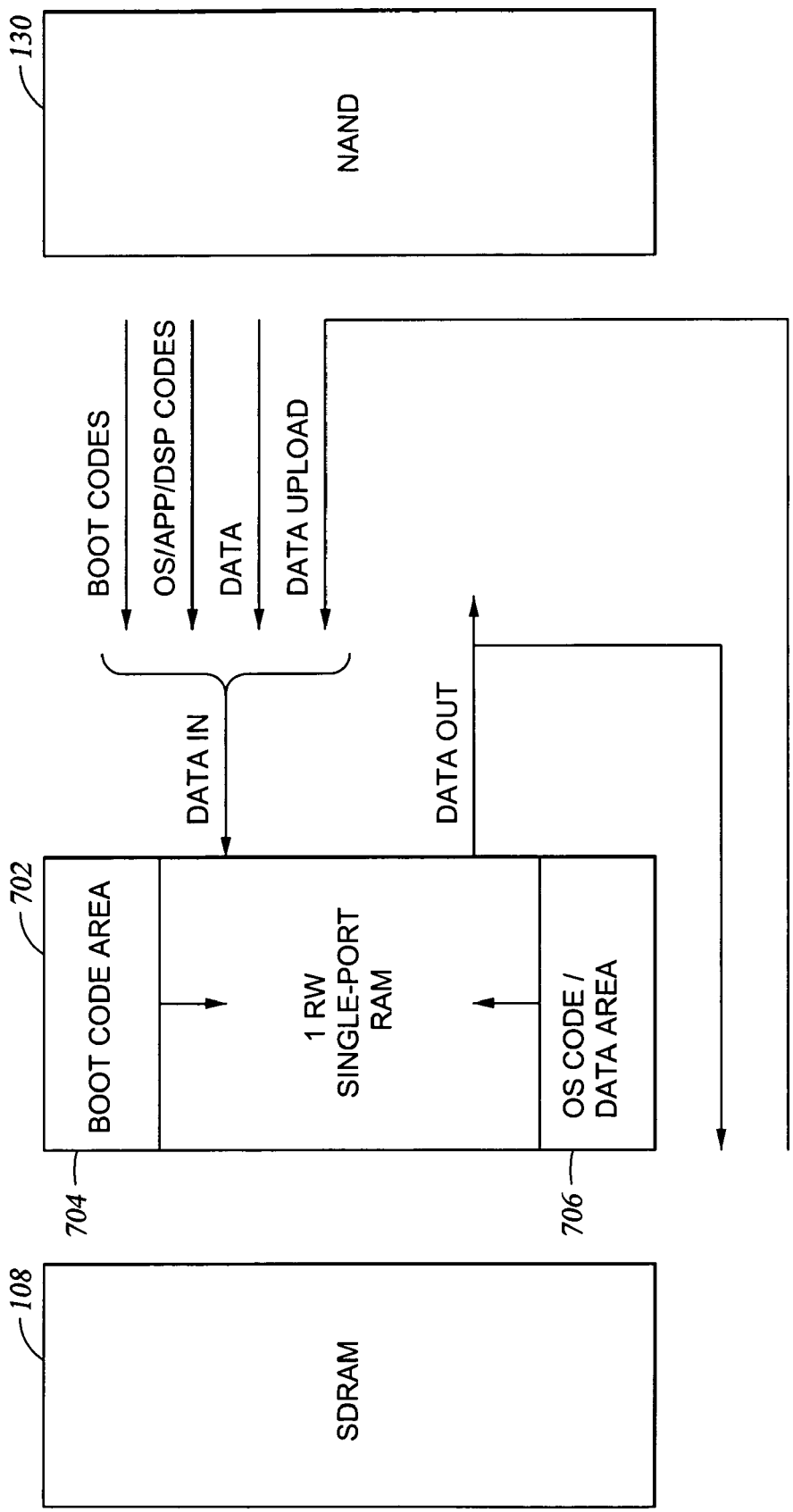
FIG. 7 depicts a combined RAM memory for storing boot codes and OS codes according to one embodiment of the invention.

As another example, FIG. 7 depicts a combined RAM memory 702 (which may also be referred to as a shared buffer 702) for storing boot codes 132 and OS codes 136 according to one embodiment of the invention. As depicted, the boot codes 132, OS/App/DSP codes 136, and other data 138 may be transferred as described above from the NAND flash memory 130 into the shared buffer 702. Optionally, the other data may be transferred directly to the SDRAM array 108. The controller codes 134 may be stored, for example, in the controller code buffer 116.

In one embodiment, to avoid overwriting other data in the combined memory 702, the boot codes 132 may be stored in a boot code area 704 in the combined memory 702 and the OS codes, other codes, and data may be stored in an OS code/data area 706 in the combined memory 702. To efficiently store data in the combined memory 702, the boot code area 704 may be stored at the beginning of the combined memory 702 while the OS code/data area 706 may be stored at the end of the combined memory 702. As data and code are transferred into the combined memory 702, the memory 702 may be filled from the low memory address upwards and from the high memory addresses downwards. In one embodiment, control circuitry may be used to ensure that no collision of the boot code area 704 and the OS code/data 706 area occurs. Optionally, in some cases, the boot code 132 stored in the shared memory 702 may be used to initialize the host 102 and then overwritten after the host 102 has booted.

As described above, embodiments of the invention provide a DRAM device 110 with a DMA engine 120 which may be utilized to automatically transfer boot codes 132 and controller codes 134 from a NAND flash memory 130 to the DRAM memory device 110. The DMA engine 120 may also receive commands directly or indirectly from external devices allowing OS/App/DSP codes 136 to be shadowed in the DRAM device 110. In some cases, the DMA engine 120 may perform initial boots without the embedded microcontroller 118 or host 102 input and may be adaptable to re-locatable boot/controller code storage locations. Also, in some cases, it may be possible to use a shared buffer 702 for storing boot codes 132 and OS or other codes 136.

While the foregoing is directed to embodiments of the present invention, other and further embodiments of the invention may be devised without departing from the basic scope thereof, and the scope thereof is determined by the claims that follow.

What is claimed is:

1. A method for initializing a computer system, wherein the computer system includes a processor, a volatile memory, and a non-volatile memory, the method comprising:

when the computer system is initialized, automatically copying initialization code stored in the non-volatile memory to the volatile memory via a non-volatile memory interface of the volatile memory, wherein circuitry in the volatile memory automatically creates the copy of the initialization code; and executing, by the processor, the copy of the initialization code from the volatile memory, wherein the initialization code is obtained from the volatile memory via a volatile memory interface of the volatile memory.

2. The method of claim 1, wherein automatically copying the initialization code comprises:

performing a direct memory access to transfer the initialization code from the non-volatile memory to the volatile memory, wherein the circuitry in the volatile memory performs the direct memory access.

3. The method of claim 2, wherein performing a direct memory access to transfer the initialization code from the non-volatile memory to the volatile memory comprises:

automatically transferring boot code into a boot code buffer; and automatically transferring controller code into a controller code buffer.

4. The method of claim 3, wherein the boot code and the controller code are placed in a shared buffer comprising the boot code buffer and the controller code buffer.

5. The method of claim 3, wherein the processor executes the boot code from the boot code buffer and wherein a controller on the volatile memory device executes the controller code from the controller code buffer.

6. A method for initializing a computer system, wherein the computer system includes a processor, a dynamic, random access memory (DRAM) memory, and a flash memory, the method comprising:

when the computer system is initialized, automatically creating a copy of boot code stored in the flash memory in a boot code buffer of the DRAM memory, wherein direct memory access circuitry in the DRAM memory automatically creates the copy, wherein the boot code is loaded into the DRAM memory from the flash memory via a nonvolatile memory interface of the DRAM memory; and executing the copy of the boot code from the boot code buffer in the DRAM memory, wherein the copy of the boot code is loaded by the processor via a volatile memory interface of the DRAM memory.

7. The method of claim 6, wherein the processor executes the copy of the boot code from the boot code buffer, and further comprising:

in response to executing the copy of the boot code, issuing commands from the processor to the DRAM memory, wherein the commands cause the direct memory access circuitry to automatically create a copy of operating system code stored in the flash memory in a memory array of the DRAM memory; and executing the copy of the operating system code from the memory array of the DRAM memory.

8. The method of claim 6, wherein the copy of the boot code stored in flash memory is created via a direct memory access transfer.

9. The method of claim 8, wherein the direct memory access transfer is initiated without commands issued between the processor and DRAM memory.

10. The method of claim 6, further comprising:

after creating the copy of the boot code, automatically creating a copy of controller code stored in the flash memory in a controller code buffer of the DRAM memory, wherein the direct memory access circuitry in the DRAM memory automatically creates the copy; and executing the copy of the controller code stored in the controller code buffer with a controller in the DRAM memory.

11. A method for initializing a computer system, wherein the computer system includes a processor, a volatile memory, and a non-volatile memory, the method comprising:

when the computer system is initialized, automatically copying initialization code stored in the non-volatile memory to the volatile memory via a nonvolatile memory interface of the volatile memory, wherein circuitry in the volatile memory automatically creates the copy without receiving any command input from the processor; and executing, by the processor, the copy of the initialization code from the volatile memory, wherein the initialization code is obtained from the volatile memory via a volatile memory interface of the volatile memory.

* * * * *